United States Patent [19]

Miceli

[11] Patent Number: 5,228,914
[45] Date of Patent: Jul. 20, 1993

[54] PUMICE CONTAINING COMPOSITION

[76] Inventor: Joseph J. Miceli, 7902 Limoges Dr. South, Jacksonville, Fla. 32210

[21] Appl. No.: 901,880

[22] Filed: Jun. 22, 1992

[51] Int. Cl.$^5$ ............................................. C04B 7/32
[52] U.S. Cl. .................... 106/694; 106/692; 106/676; 106/681; 106/711; 106/811
[58] Field of Search ............... 106/692, 694, 711, 811, 106/676, 681

[56] References Cited

U.S. PATENT DOCUMENTS

| 4,259,824 | 4/1981 | Lopez | 106/711 |
| 5,017,232 | 5/1991 | Miceli | 106/716 |
| 5,167,710 | 12/1992 | Leroux et al. | 106/694 |

FOREIGN PATENT DOCUMENTS 53-16005  5/1978  Japan .................... 106/692

*Primary Examiner*—Karl Group
*Assistant Examiner*—Anthony J. Green
*Attorney, Agent, or Firm*—Thomas C. Saitta

[57] ABSTRACT

A composition for forming a hard material having good high temperature insulation, reflection and diffusion properties, comprising a mixture of crushed pumice, calcium aluminate cement and glass fibers, which forms the hard material upon the addition of water and after allowing the mixture to cure.

10 Claims, No Drawings

PUMICE CONTAINING COMPOSITION

BACKGROUND OF THE INVENTION

The invention relates generally to the field of curable compositions for forming a refractory material, as well as the refractory material itself, as used for example in ovens or grills. In particular, the invention relates to the field of such compositions where the resulting hardened material is comprised of crushed pumice, calcium aluminate cement and glass fibers.

For ultra-high temperature applications, special materials which can withstand the extreme temperatures without rapid deterioration must be used. Many such materials are known in the industry. For example, it is well known to use refractory blocks or bricks in industrial ovens. These materials have both high temperature resistance and high strength.

Pumice is a volcanic stone which is strong yet lightweight. A cubic foot can weigh as little as 24 to 30 pounds, due to the presence of numerous sealed air chambers and pockets within the individual stones. Crushed pumice can range in size from pieces three-quarter inches in diameter to that of a grain of sand. Pumice will actually float in water. Prior to this invention, the pumice has always been mixed with portland cement and formed into blocks, panels or bricks, usually for structural applications. Portland cement is an hydraulic cement produced by pulverizing clinker consisting essentially of hydraulic calcium silicates, usually containing one or more forms of calcium sulfate as an interground addition. The pumice allows for a block roughly one-third lighter in weight than a block of conventional concrete. The pumice block has good insulation properties due to the entrapped air chambers, but is not suitable for extreme temperature applications because the portland cement will degrade as high temperatures.

It has been discovered that pumice panels or blocks having improved temperature insulation, radiation and diffusion properties can be formed of a new composition not known in the field, where portland cement is replaced by calcium aluminate cement. The pumice panels or blocks are particularly applicable for use as liners in high temperature ovens or grills, such as are used in industry for curing or cooking. The presence of the pumice containing panels or blocks significantly increases the efficiency of the ovens and grills, resulting in savings in fuel consumption and processing time.

BRIEF SUMMARY OF THE INVENTION

The composition comprises the combination of pumice, calcium aluminate cement, and a small amount of glass fibers for strength, which when mixed with water form a hard material after curing at room temperature. Calcium aluminate cement is well-known in the industry, and the material is formed by sintering or fuming bauxite and lime in a rotary or shaft kiln. To obtain calcium aluminate cement of high purity, with the ability to withstand temperatures of 1750 degrees C, high purity lime is reacted with calcined or hydrated alumina. The composition can be formed into blocks, panels or bricks of various shapes and sizes for use in ovens and grills of various configurations. Some of the pumice can be replaced with zirconium silicate, but this results in a much heavier material.

DETAILED DESCRIPTION OF THE INVENTION

The composition comprises pumice, calcium aluminate cement, and glass fibers, combined and mixed with water to form a curable material. The cured material, in the shape of blocks, panels or bricks, is suitable for use in extreme temperature situations. The blocks have high insulating values and high compressive strengths.

The pumice used in the composition is crushed pumice ranging in size from that of a grain of sand up to three-quarters of an inch. The pumice should be of high quality such that impurities are kept to a minimum. The glass fibers are preferably used in the form of short, loose fibers. The glass fibers are added to prevent brittleness in the cured material. Calcium aluminate cement is available commercially. High grade calcium aluminate cement is preferred, such as sold under the tradename "Secarr" by Lafarge.

To form the composition, the preferable combination is approximately two thirds by volume pumice and one third by volume calcium aluminate cement, with a relatively small amount (less than two volume percent) of glass fibers. To this combination, a suitable amount of water is added to mix the ingredients and initiate the curing process. The mixture is then poured into molds or forms to form the blocks or panels and allowed to cure to form the hard material. The pumice may be in an amount up to 80 volume percent or as low as 20 volume percent, with the calcium aluminate cement correspondingly as low as 20 volume percent or as high as 80 volume percent.

The composition provides unexpected results with regard to degradation and deterioration. The composition shows no significant degradation or deterioration in the 1500 degrees F range. Providing a surface glaze on the material by mold techniques or surface flame treatment produces increased heat tolerance and also strengthens the material.

A portion of the pumice may be replaced by zirconium silicate, commonly known as zircon. This results in a material of equal or better thermal properties, but the material is proportionally heavier than when the material contains no zircon.

The true scope and definition of the invention is to be as set forth in the following claims.

I claim:

1. A composition for forming a high strength material with improved high temperature insulation, radiation and diffusion properties upon the addition of water, comprising a mixture of crushed pumice, calcium aluminate cement and glass fibers, where the volume of the crushed pumice is from 20 to 80 percent of the total volume, the volume of calcium aluminate cement is from 80 to 20 percent of the total volume, and the volume of the glass fibers is less than 2 percent of the total volume.

2. The composition of claim 1, where the volume of the crushed pumice is approximately 66 percent of the total volume and the volume of the calcium aluminate cement is approximately 33 percent of the total volume.

3. The composition of claim 1, further comprising zirconium silicate.

4. The composition of claim 3, where the combined volume of the crushed pumice and zirconium silicate is from 20 to 80 percent of the total volume, the volume of the calcium aluminate cement is from 80 to 20 percent of the total volume, and the volume of the glass fibers is less than 2 percent of the total volume.

5. A high strength, hard material having improved high temperature insulation, radiation and diffusion properties, comprising a mixture of crushed pumice, calcium aluminate cement and glass fibers, formed by adding water to the mixture and allowing said mixture to harden, where the volume of the crushed pumice is from 20 to 80 percent of the total volume, the volume of calcium aluminate cement is from 80 to 20 percent of the total volume, and the volume of the glass fibers is less than 2 percent of the total volume.

6. The composition of claim 5, where the volume of the crushed pumice is approximately 66 percent of the total volume and the volume of the calcium aluminate cement is approximately 33 percent of the total volume.

7. The composition of claim 5, further comprising zirconium silicate.

8. The composition of claim 7, where the combined volume of the crushed pumice and zirconium silicate si from 20 to 80 percent of the total volume, the volume of the calcium aluminate cement is from 80 to 20 percent of the total volume, and the volume of the glass fibers is less than 2 percent of the total volume.

9. A high strength, hard material having improved high temperature insulation, radiation and diffusion properties, prepared by a process comprising the steps of:

(A) mixing crushed pumice, calcium aluminate cement and glass fibers, where the volume of the crushed pumice is from 20 to 80 percent of the total volume, the volume of calcium aluminate cement is from 80 to 20 percent of the total volume, and the volume of the glass fibers is less than 2 percent of the total volume;
(B) adding water to form a pourable mixture;
(C) pouring said mixture into a form;
(D) allowing said mixture to cure to form a hard material;
(E) removing said hard material from said form.

10. The composition of claim 9, where the volume of the crushed pumice is approximately 66 percent of the total volume and the volume of the calcium aluminate cement is approximately 33 percent of the total volume.

* * * * *